(12) United States Patent
Malik

(10) Patent No.: US 10,413,830 B2
(45) Date of Patent: Sep. 17, 2019

(54) INTERACTIVE PLAYING CARD GAME AND BASEBALL GAME AND METHOD OF PLAYING SAME

(71) Applicant: Rahul Malik, Westbury, NY (US)

(72) Inventor: Rahul Malik, Westbury, NY (US)

( * ) Notice: Subject to any disclaimer, the term of this patent is extended or adjusted under 35 U.S.C. 154(b) by 279 days.

(21) Appl. No.: 15/224,740

(22) Filed: Aug. 1, 2016

(65) Prior Publication Data

US 2018/0028919 A1    Feb. 1, 2018

(51) Int. Cl.
|  |  |
|---|---|
| A63F 9/24 | (2006.01) |
| A63F 13/00 | (2014.01) |
| G06F 17/00 | (2019.01) |
| G06F 19/00 | (2018.01) |
| A63F 13/65 | (2014.01) |
| A63F 13/812 | (2014.01) |
| A63F 1/04 | (2006.01) |

(52) U.S. Cl.
CPC ............ *A63F 13/65* (2014.09); *A63F 1/04* (2013.01); *A63F 13/812* (2014.09); *A63F 2001/0441* (2013.01)

(58) Field of Classification Search
USPC ............................ 463/1, 3, 5, 15, 20, 22, 39
See application file for complete search history.

(56) References Cited

U.S. PATENT DOCUMENTS

| 4,141,548 | A |   | 2/1979 | Everton |  |
|---|---|---|---|---|---|
| 5,026,058 | A | * | 6/1991 | Bromley | A63F 9/24 273/460 |
| 5,730,443 | A |   | 3/1998 | Allen |  |
| 6,783,128 | B2 | * | 8/2004 | Casey | A63F 3/00031 273/244.1 |
| 7,451,986 | B1 |   | 11/2008 | Thrasher |  |
| 7,810,815 | B2 | * | 10/2010 | Connaway | A63F 1/02 273/244.2 |

(Continued)

*Primary Examiner* — Adetokunbo O Torimiro
(74) *Attorney, Agent, or Firm* — James R. McDaniel

(57) ABSTRACT

A method of playing an interactive baseball-related card game, comprising the steps of: dealing each of nine outcome cards to each of the players, wherein each of the outcome cards is based upon the likelihood of a particular event occurring during a plate appearance by a batter; arranging, by each player, each of the outcome cards based upon a predicted outcome of the plate appearance of the batter by that player to create an outcome card lineup, wherein the outcome cards are arranged such that a most likely outcome of the plate appearance of the batter, as predicted by that particular player, is placed at the top of all of the outcome cards in that particular player's outcome card lineup; monitoring the plate appearance of the batter; determining an actual outcome of the plate appearance of the batter; reviewing each of the player's outcome card lineups to determine which player is the winning player for the plate appearance by the batter by determining which player has a correct outcome card that corresponds to the actual outcome and which of the players with the correct outcome card has the correct outcome card located closest to the top of all of the outcome cards in that particular player's outcome card lineup; determining how many outcome cards the winning player discards based upon the actual outcome of the plate appearance; and determining a winner of the interactive baseball-related card game.

4 Claims, 7 Drawing Sheets

(56) References Cited

U.S. PATENT DOCUMENTS

| | | |
|---|---|---|
| 7,862,044 B1 | 1/2011 | Spelman et al. |
| 7,909,332 B2 | 3/2011 | Root |
| 8,092,306 B2 | 1/2012 | Root |
| 8,360,842 B2 | 1/2013 | Simon |
| 8,702,103 B2 | 4/2014 | Miller |
| 2009/0085297 A1 | 4/2009 | Morales |
| 2012/0009993 A1* | 1/2012 | Wright ................ G07F 17/3225 463/26 |

* cited by examiner

INTERACTIVE PLAYING CARD GAME AND BASEBALL GAME AND METHOD OF PLAYING SAME

FIELD OF THE INVENTION

This invention relates, generally to an interactive playing card game, and in particular, to an interactive playing card game that is played in conjunction with a live or pre-recorded sporting event such as baseball. Players must use the outcome cards provided to predict the outcome of the plate appearance. By correctly predicting the outcome of the plate appearance, the players earn the right to discard a set amount of their outcome cards.

BACKGROUND OF THE INVENTION

Prior to the present invention, as set, forth in general terms above and more specifically below, it is known, to use various card, games in conjunction with sporting events. See, for example, U.S. Pat. No. 4,141,548 by Everton, U.S. Pat. No. 5,730,443 by Allen, U.S. Pat. No. 6,783,128 by Casey et al., U.S. Pat. No. 7,451,986 by Thrasher, U.S. Pat. No. 7,810,815 by Connaway, U.S. Pat. No. 7,862,044 by Spelman et al., U.S. Pat. No. 7,909,332 by Root, U.S. Pat. No. 8,092,306 by Root, U.S. Pat. No. 8,360,842 by Simon, U.S. Pat. No. 8,702,103 by Miller and U.S. Patent Application No. 2009/0085297 by Morales. While these various card games may have been generally satisfactory, there is nevertheless a need in the art for a new and improved interactive playing card game that is played in conjunction with a live or pre-recorded sporting event such as baseball whereby the players must use the outcome cards provided to correctly predict the outcome of the plate appearance in order to earn the right to discard a set amount of their outcome cards.

It is a purpose of this invention to fulfill this and other needs in the art in a manner more apparent to the skilled artisan once given the following disclosure.

SUMMARY OF THE INVENTION

A first aspect of the present invention is a method of playing an interactive baseball-related card game, wherein the method is comprised of the steps of: dealing each of nine outcome cards to each of the players, wherein each of the outcome cards is based upon the likelihood of a particular event occurring during a plate appearance by a batter; arranging, by each player, each of the outcome cards based upon a predicted outcome of the plate appearance of the batter by that player to create an outcome card lineup, wherein the outcome cards are arranged such that a most likely outcome of the plate appearance of the batter, as predicted by that particular player, is placed closest to the top of all of the outcome cards in that particular player's outcome card lineup; monitoring the plate appearance of the batter; determining an actual outcome of the plate appearance of the batter; reviewing each of the player's outcome card lineups to determine which player is the winning player for the plate appearance by the batter by determining which player has a correct outcome card that corresponds to the actual outcome and which of the players with the correct outcome card has the correct outcome card located closest to the top of all of the outcome cards in that particular player's outcome card lineup; determining how many outcome cards the winning player discards based upon the actual outcome of the plate appearance; and determining a winner of the interactive baseball-related card game.

In one embodiment of the first aspect of the present invention, the particular event occurring during a plate appearance by a batter is one of the following events: a single, a double, a triple, a home run, a walk, a strike out, a ground out, a fly out and an error.

In another embodiment of the first aspect of the present invention, the step of monitoring the plate appearance of the batter is further comprised of the step of: determining if a pitch has been delivered to the batter.

In still another embodiment of the first aspect of the present invention, the step of determining if a pitch has been delivered to the batter is further comprised of the step of: allowing the players to re-arrange, if desired, each of the outcome cards in their outcome card lineups based upon a revised predicted outcome of the plate appearance of the batter by that player to create a revised outcome card lineup if a pitch has not been delivered to the batter.

In yet another embodiment of the first aspect of the present invention, the step of determining if a pitch has been delivered to the batter is further comprised of the step of: determining if a batter's pitch count includes two strikes or three balls.

In still yet another embodiment of the first aspect of the present invention, the step of determining if a batter's pitch count includes two strikes or three balls is further comprised of the step of: allowing the players to re-arrange, if desired, each of the outcome cards in their outcome card lineups based upon another revised predicted outcome of the plate appearance of the batter by that player to create another revised outcome card lineup if a batter's pitch count does not include two strikes or three balls.

In yet another embodiment of the first aspect of the present invention, the step of determining how many outcome cards the winning player discards based upon the actual outcome of the plate appearance is further comprised of the step of: discarding a predetermined number of outcome cards from the winning player's outcome card lineup based upon the actual outcome of the plate appearance.

In another embodiment of the first aspect of the present invention, the step of determining a winner of the interactive baseball-related card game is further comprised of the step of: determining which player is the first player to discard all of their outcome cards.

A second aspect of the present invention is a method of playing an interactive card game that is played in conjunction with observing a live or recorded baseball game, wherein the method is comprised of the steps of: determining a number of players to play in an interactive baseball-related card game; distributing each of nine outcome cards to each of the players, wherein each of the outcome cards is based upon the likelihood of a particular event occurring during a plate appearance by a batter; ordering in a row, by each player, each of the outcome cards based upon a projected outcome of the plate appearance of the batter by that player to create an outcome card lineup, wherein the outcome cards are organized face down such that a most likely outcome of the plate appearance of the batter, as projected by that particular player, is placed at the furthest left of all of the outcome cards in that particular player's outcome card lineup; monitoring the plate appearance of the batter; determining an actual outcome of the plate appearance of the batter; comparing each of the player's outcome card lineups to decide which player is the winning player for the plate appearance by the batter by deciding which player has a correct outcome card that corresponds to the actual outcome and which of the players with the correct outcome card has the correct outcome card located closest to the left of all of the outcome cards in that particular player's outcome card lineup; deciding how many outcome cards the winning player discards based upon the actual outcome of the plate appearance; and determining a winner of the interactive baseball-related card game.

In one embodiment of the second aspect of the present invention, the particular event occurring during a plate appearance by a batter is one of the following events: a single, a double, a triple, a home run, a walk, a strike out, a ground out, a fly out and an error.

In another embodiment of the second aspect of the present invention, the step of monitoring the plate appearance of the batter is further comprised of the step of: deciding if a pitch has been delivered to the batter.

In another embodiment of the second aspect of the present invention, the step of deciding if a pitch has been delivered to the batter is further comprised of the step of: permitting the players to re-arrange, if desired, each of the outcome cards in their outcome card lineups based upon a revised projected outcome of the plate appearance of the batter by that player to create a revised outcome card lineup if a pitch, has not been delivered to the batter.

In still another embodiment of the second aspect of the present invention, the step of deciding if a pitch has been delivered to the batter is further comprised of the step of: deciding if a batter's pitch count includes two strikes or three balls.

In yet another embodiment of the second aspect of the present invention, the step of deciding if a batter's pitch count includes two strikes or three balls is further comprised of the step of: permitting the players to re-arrange, if desired, each of the outcome cards in their outcome card lineups based upon another revised projected outcome of the plate appearance of the batter by that player to create another revised outcome card lineup if a batter's pitch count does not include two strikes or three balls.

In a further embodiment of the second aspect of the present invention, the step of determining how many outcome cards the winning player discards based upon the actual outcome of the plate appearance is further comprised of the step of: discarding a predetermined number of outcome cards from the winning player's outcome card lineup based upon the actual outcome of the plate appearance.

In a yet further embodiment of the second aspect of the present invention, the step of determining a winner of the interactive baseball-related card game is further comprised of the step of: determining which player is the first player to discard all of their outcome cards.

A third aspect of the present invention is a non-transitory computer readable medium having encoded thereon software programmed to cause a computer to perform a method of playing an interactive card game that is played in conjunction with observing a live or recorded baseball game, comprising the steps of: dealing each of nine outcome cards to each of the players before the start of an interactive baseball-related card game, wherein each of the outcome cards is based upon the likelihood of a particular event occurring during a plate appearance by a batter; arranging, by each player, each of the outcome cards based upon a predicted outcome of the plate appearance of the batter by that player to create an outcome card lineup, wherein the outcome cards are arranged such that a most likely outcome of the plate appearance of the batter, as predicted by that particular player, is placed at the top of all of the outcome cards in that particular player's outcome card lineup; monitoring the plate appearance of the batter; determining an actual outcome of the plate appearance of the batter; reviewing each of the player's outcome card lineups to determine which player is the winning player for the plate appearance by the batter by determining which player has a correct outcome card that corresponds to the actual outcome and which of the players with the correct outcome card has the correct outcome card located closest to the top of all of the outcome cards in that particular player's outcome card lineup; determining how many outcome cards the winning player discards based upon the actual outcome of the plate appearance; and determining a winner of the interactive baseball-related card game.

In an embodiment of the third aspect of the present invention, the step of monitoring the plate appearance of the batter is further comprised of the step of: determining if a pitch has been delivered to the batter.

In another embodiment of the third aspect of the present invention, the step of determining if a pitch has been delivered to the batter is further comprised of the step of: allowing the players to re-arrange, if desired, each of the outcome cards in their outcome card lineups based upon a revised predicted outcome of the plate appearance of the batter by that player to create a revised outcome card lineup if a pitch has not been delivered to the batter.

In still another embodiment of the third aspect of the present invention, the step of determining if a pitch has been delivered to the batter is further comprised of the step of: determining if a batter's pitch count includes two strikes or three balls.

The preferred interactive playing card game that is played in conjunction with a sporting event such as baseball game, according to various embodiments of the present invention, offers the following advantages: ease of use of the set of playing cards, the portability of the set of playing cards, and the ability of the set of playing cards to be used at any location where the sporting event is being played live or remotely viewed. In fact, in many of the preferred embodiments, these factors of ease of use, portability, and the ability of the set of playing cards to be used at any location where the sporting event is being played live or remotely viewed are optimized to an extent that is considerably higher than heretofore achieved in prior, known sports-related card games.

BRIEF DESCRIPTION OF DRAWINGS

The above mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF PREFERRED EMBODIMENTS

Card Outcome Design

Figure 1:
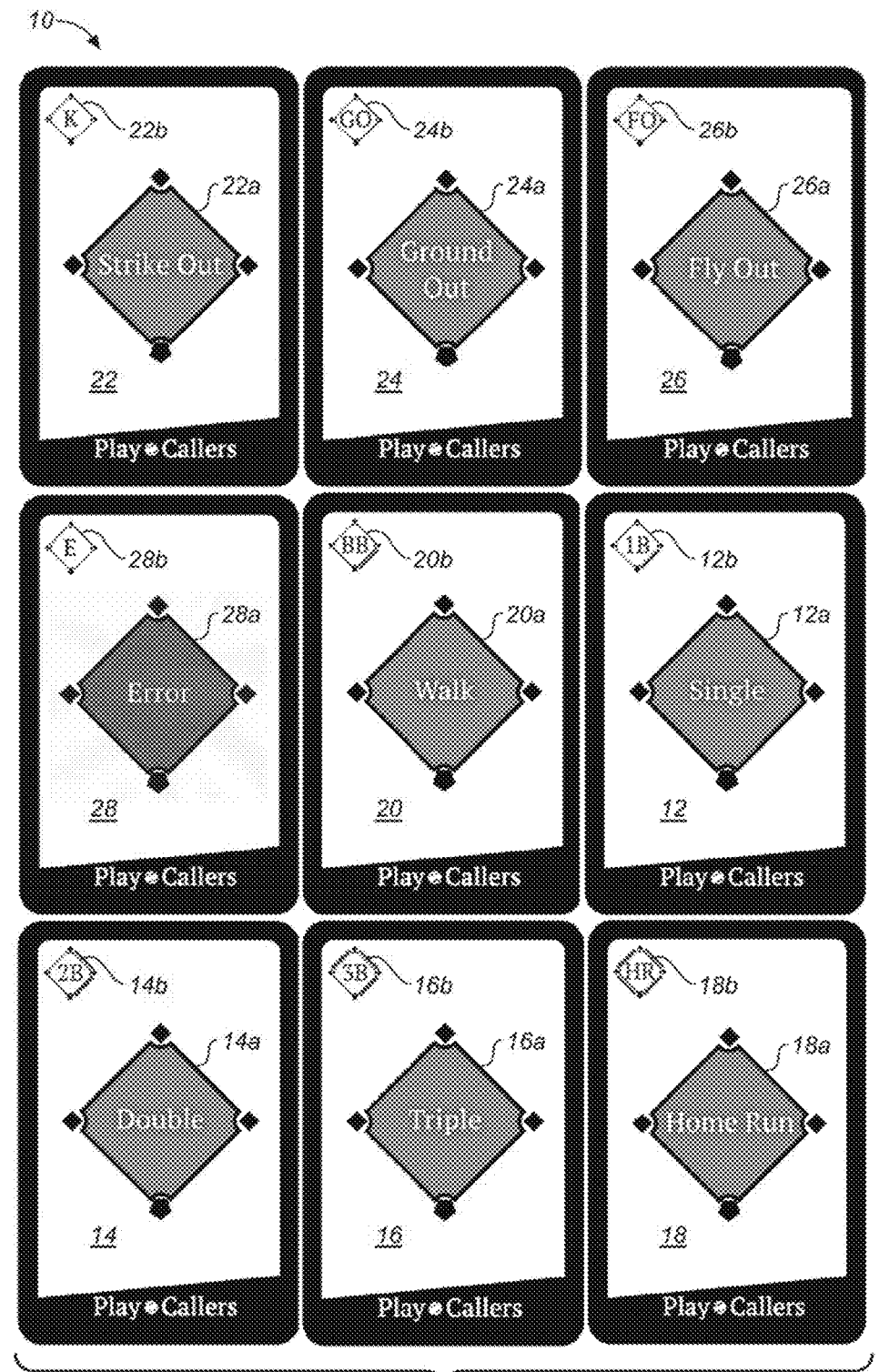
FIG. 1 is a rear plan view of each of the outcome playing cards, constructed according to the present invention.

Referring now to the drawings and more particularly to FIG. 1 there is illustrated the set 10 of playing cards, which are constructed in accordance with the present invention. As will be explained hereinafter in greater detail, the set 10 of outcome playing cards are used in conjunction with a live, televised, streamed on the Internet, played on the radio or pre-recorded sporting event such as a baseball game whereby the players must use the outcome cards provided to correctly predict the outcome of the plate appearance. By correctly predicting the outcome of the plate appearance, the players earn the right to discard a set amount of their outcome cards. The advantages of the set 10 of playing cards are ease of use of the set 10 of playing cards, the portability of the set 10 of playing cards, and the ability of the set 10 of playing cards to be used at any location where the sporting event is being played live or remotely viewed.

Considering now the set 10 of outcome playing cards, in greater detail with reference to FIG. 1, the set 10 of outcome playing cards, generally includes a deck of nine outcome cards 12-28. It is to be understood that the set 10 of outcome playing cards is constructed of any suitable, durable card stock material that is capable of having graphics placed upon the card stock material such that the graphics are not easily removed from the card stock material during the playing of the interactive card game. Also, the set 10 of outcome playing cards should be constructed such that the cards can be easily shuffled and dealt to the players over an extended number of games. Finally, the set 10 of outcome playing cards should be constructed so as to resist spindling, tearing, folding and food and beverage spills.

Each of the nine outcome cards 12-28 in the set 10 of outcome playing cards will have a particular event ("Outcome") that can happen to that particular batter during that batter's particular plate appearance. For example, on the back side of each outcome cards 12-28, the following outcomes during a plate appearance can be, but are not limited to, respectively:

Single card 12 includes the outcome phrase "Single" 12a in the center of single card 12. Located at an upper corner of single card 12 is the graphical illustration 12b of a single. It is to be understood that the graphical illustration 12b of a single is similar to how a scorekeeper marks a scorebook during a baseball game in order to denote that the batter reached first base on a single. It is to be further understood that the phrase "1B" can be used as the outcome phrase instead of the outcome phrase "Single".

Double card 14 includes the outcome phrase "Double" 14a in the center of double card 14. Located at an upper corner of double card 14 is the graphical illustration 14b of a double. It is to be understood that the graphical illustration 14b of a double is similar to how a scorekeeper marks a scorebook during a baseball game in order to denote that the batter reached second base on a double. It is to be further understood that the phrase "2B" can be used as the outcome phrase instead of the outcome phrase "Double".

Triple card 16 includes the outcome phrase "Triple" 16a in the center of triple card 16. Located at an upper corner of triple card 16 is the graphical illustration 16b of a triple. It is to be understood that the graphical illustration 16b of a triple is similar to how a scorekeeper marks a scorebook during a baseball game in order to denote that the batter reached third base on a triple. It is to be further understood that the phrase "3B" can be used as the outcome phrase instead of the outcome phrase "Triple".

Home Run card 18 includes the outcome phrase "Home Run" 18a in the center of Home Run card 18. Located at an upper corner of Home Run card 18 is the graphical illustration 18b of a homerun. It is to be understood that graphical illustration 18b of a homerun is similar to how a scorekeeper marks a scorebook during a baseball game in order to denote that the batter hit a homerun. It is to be further understood that the phrase "HR" can be used as the outcome phrase instead of the outcome phrase "Home Run".

Walk card 20 includes the outcome phrase "Walk" 20a in the center of walk card 20. Located at an upper corner of walk card 20 is the graphical illustration 20b of a walk. It is to be understood that the graphical illustration 20b of a walk is similar to how a scorekeeper marks a scorebook during a baseball game in order to denote that the batter reached first base on a walk. It is to be further understood that the phrase "BB" can be used as the outcome phrase instead of the outcome phrase "Walk".

Strike Out card 22 includes the outcome phrase "Strike Out" 22a in the center of strike out card 22. Located at an upper corner of strike out card 22 is the graphical illustration 22b of a strike out. It is to be understood that the graphical illustration 22b of a strike out is similar to how a scorekeeper marks a scorebook during a baseball game in order to denote that the batter struck out during the plate appearance. It is to be further understood that the phrase "K" can be used as the outcome phrase instead of the outcome phrase "Strike Out".

Ground Out card 24 includes the outcome phrase "Ground Out" 24a in the center of ground out card 24. Located at an upper corner of ground out card 24 is the graphical illustration 24b of a ground out. It is to be understood that the graphical illustration 24b of a ground out is similar to how a scorekeeper marks a scorebook during a baseball game in order to denote that the batter hit a ground out during the plate appearance. It is to be further understood that the phrase "GO" can be used as the outcome phrase instead of the outcome phrase "Ground Out".

Fly Out card 26 includes the outcome phrase "Fly Out" 26a in the center of fly out card 26. Located at an upper corner of fly out card 26 is the graphical illustration 26b of a fly out. It is to be understood that the graphical illustration 26b of a fly out is similar to how a scorekeeper marks a scorebook during a baseball game in order to denote that the batter hit a fly out during the plate appearance. It is to be further understood that the phrase "FO" can be used as the outcome phrase instead of the outcome phrase "Fly Out".

Error card 28 includes the outcome phrase "Error" 28a in the center of error card 28. Located at an upper corner of error card 28 is the graphical illustration 28b of an error. It is to be understood that the graphical illustration 28b of an error is similar to how a scorekeeper marks a scorebook during a baseball game in order to denote that the batter reached base on an error during the plate appearance. It is to be further understood that the phrase "E" can be used as the outcome phrase instead of the outcome phrase "Error".

It is to be understood that other outcomes during the plate appearance can be included on the set 10 of outcome playing cards without detracting from the authenticity and excitement of the interactive card game such as, but not limited to: passed ball; pop out; foul out; catcher's interference; fan interference; balk; hit by pitch; fielder's interference; and/or fielder's choice.

Figure 2:
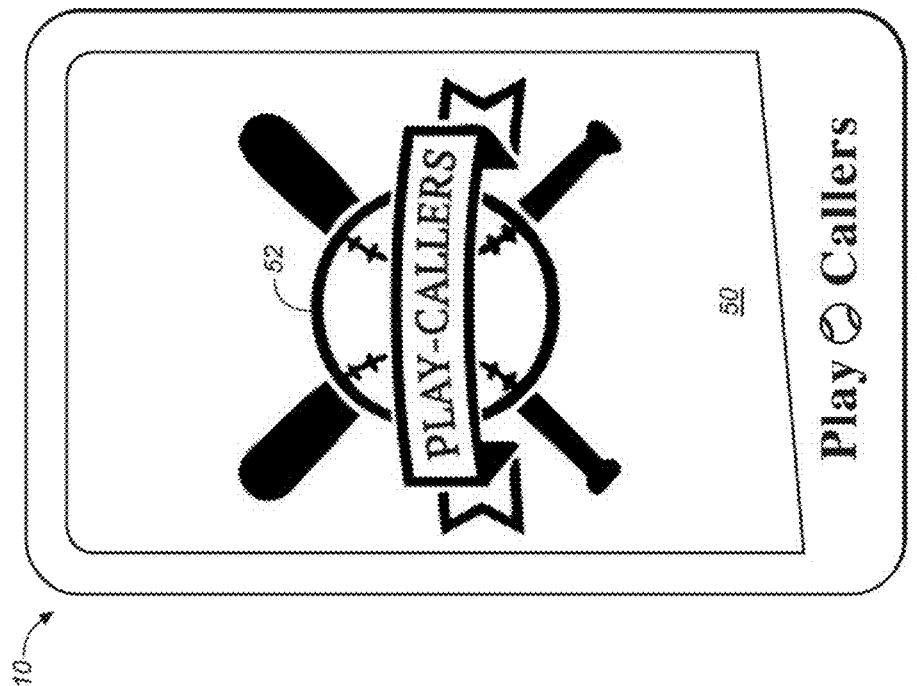
FIG. 2 is a front plan view of one of the playing cards, constructed according to the present invention.

Considering now the set 10 of outcome playing cards in greater detail with respect to FIG. 2, each of the set 10 of outcome playing cards includes a front portion 50 that includes a card game emblem graphical illustration 52.

Figure 3:
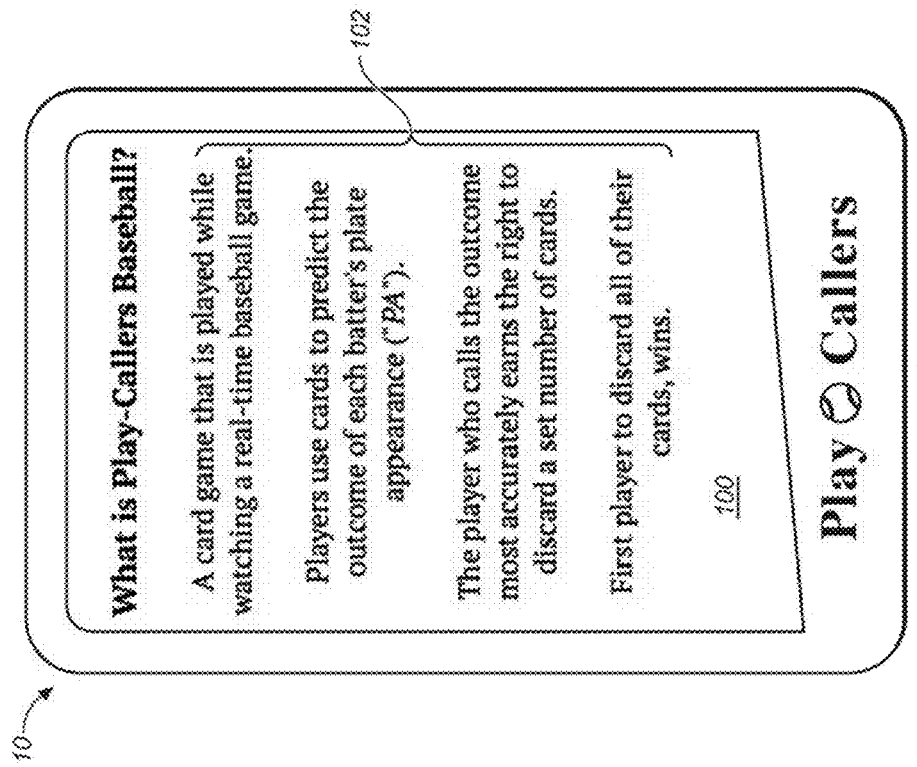
FIG. 3 is a rear plan view of another playing card that includes a summary of the interactive card game, constructed according to the present invention.

Considering now the set 10 of outcome playing cards in greater detail with respect to FIG. 3, the set 10 of outcome playing cards also includes a game summary playing card 100. Located on the back of game summary playing card 100 is an overview or summary 102 of how the interactive playing card game and baseball game is played, as will be discussed in greater detail later. It is to be understood that the game summary 102 may be included on the packaging in which the set 10 of outcome paying cards is placed. It is to be further understood that the purpose of overview or summary 102 is to entice the prospective buyer or player of, the set 10 of outcome playing cards into buying or playing the interactive playing card game without having to set forth, at this point, all of the rules and regulations of playing the interactive playing card game.

Figure 4A:
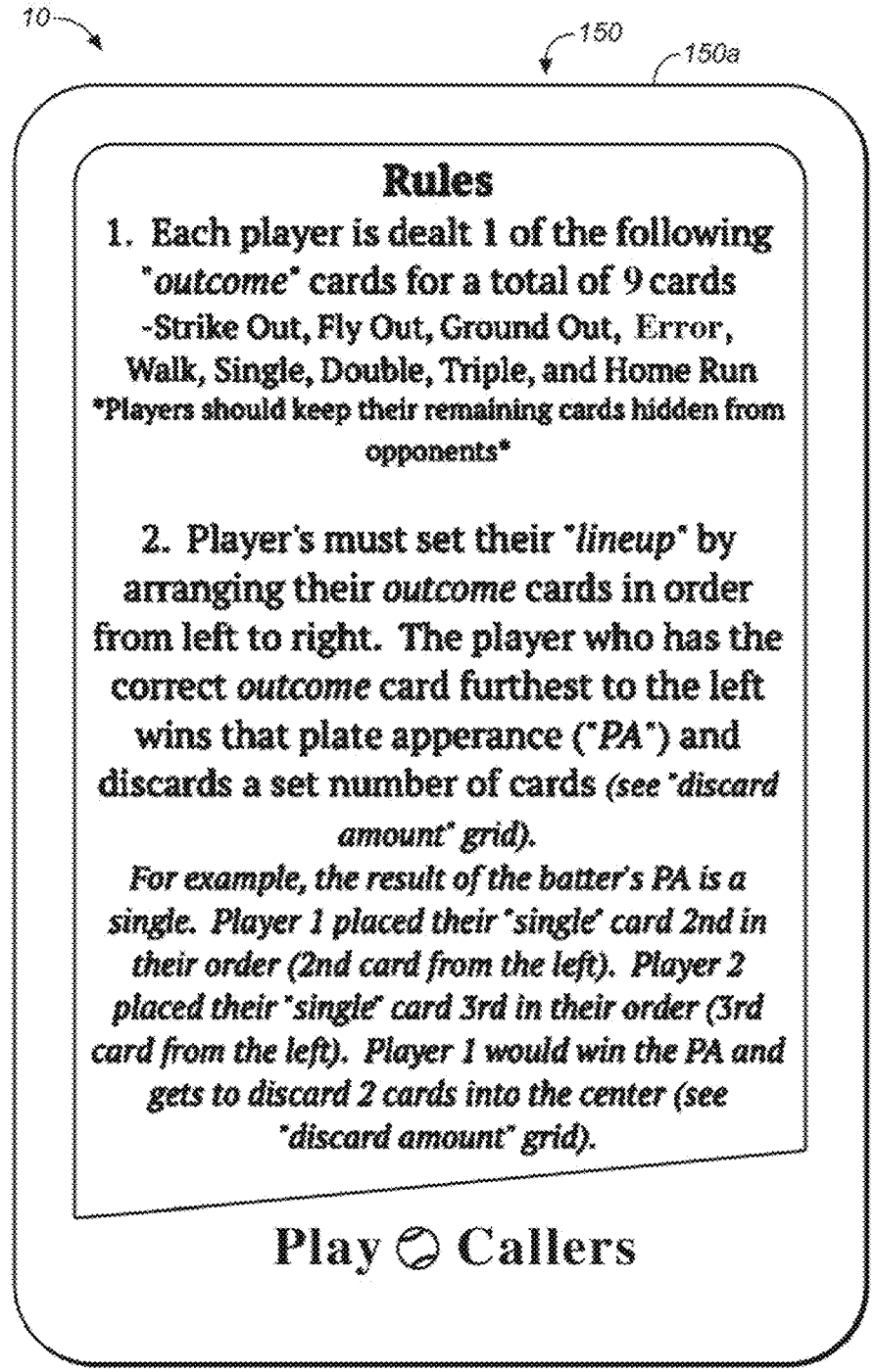
FIGS. 4A to 4C are rear plan views of still more playing cards that include a review of the rules for playing the interactive card game, constructed according to the present invention.
Figure 4B:
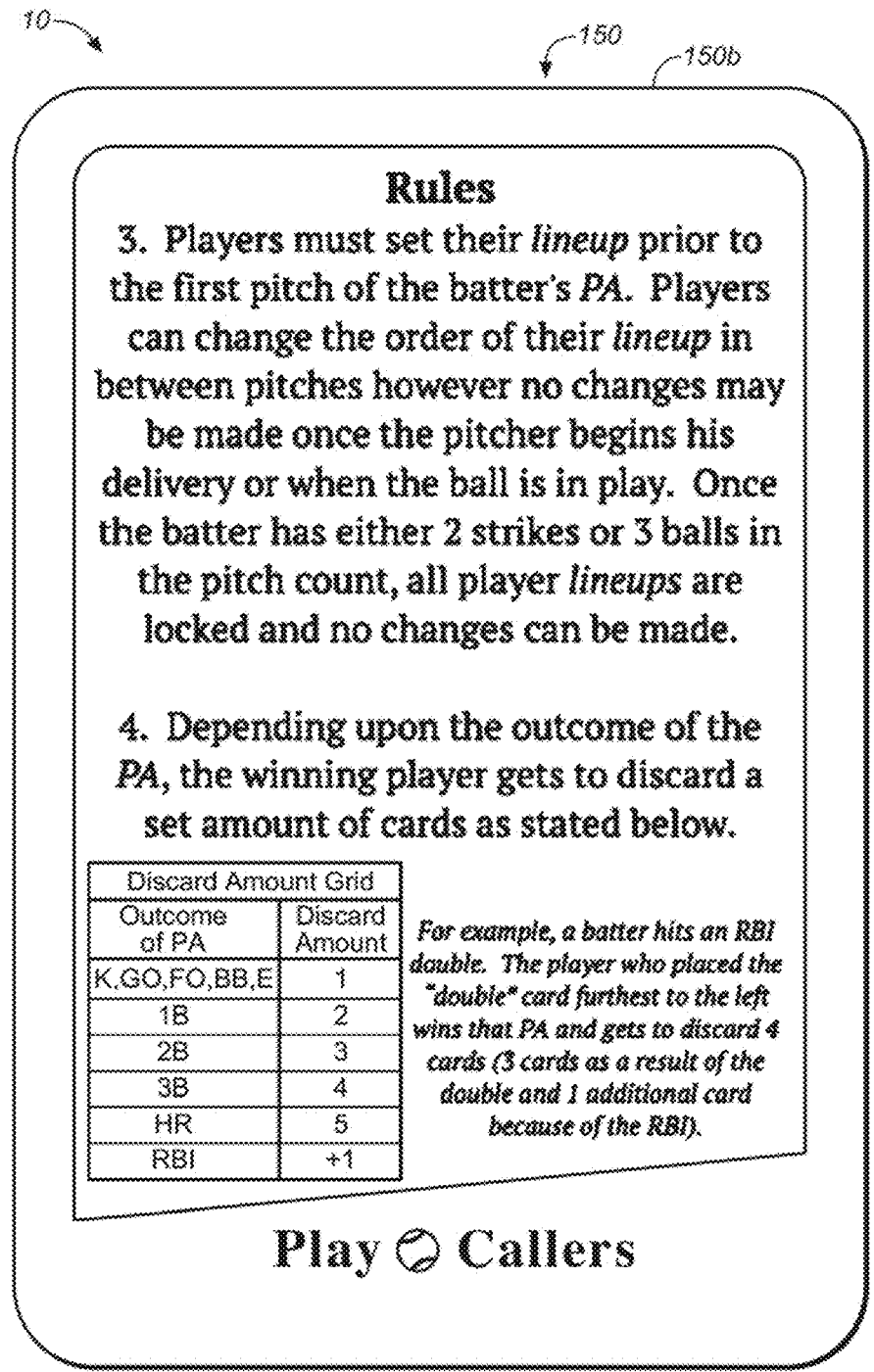
Figure 4C:
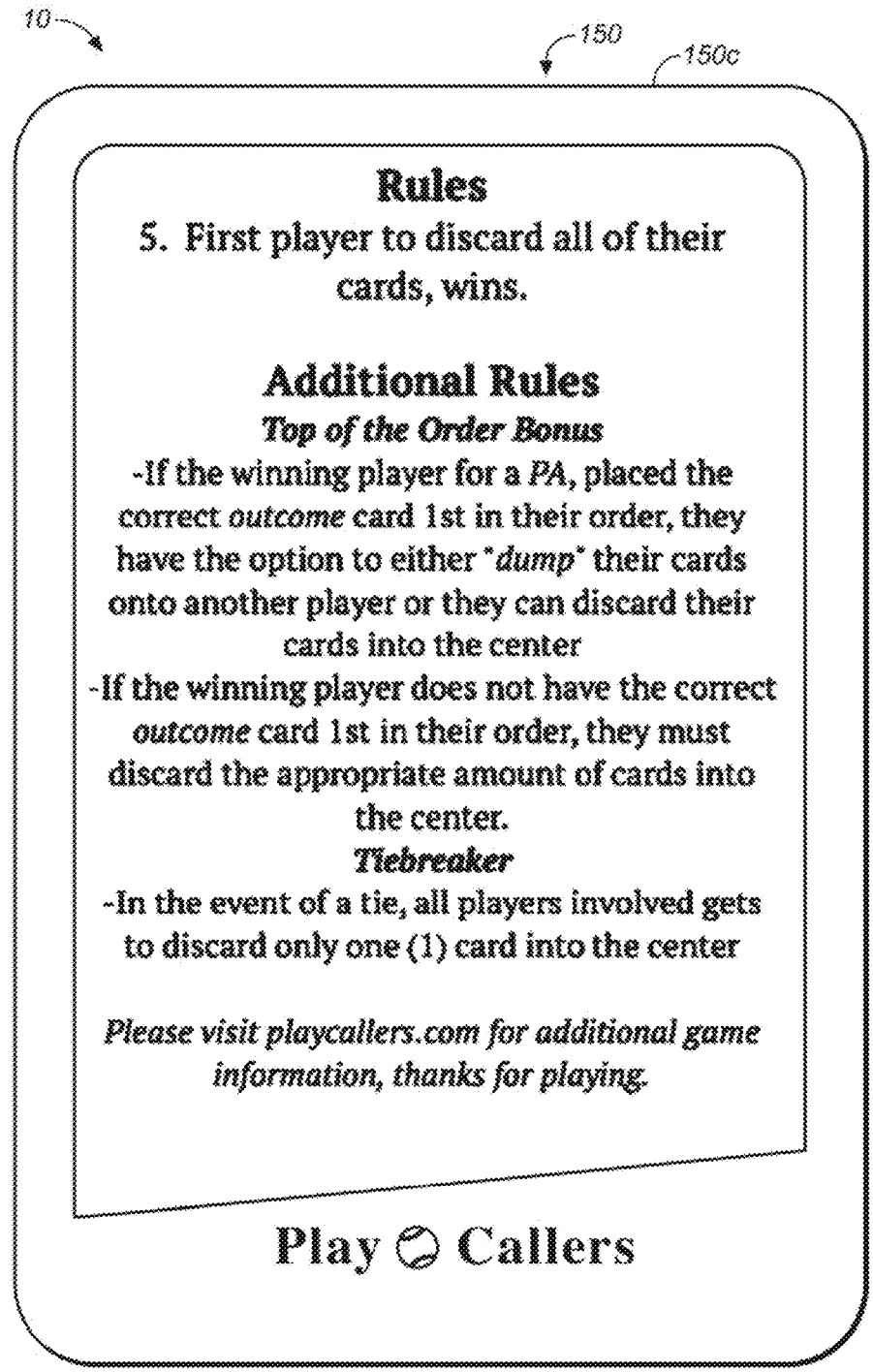

Considering now the set 10 of outcome playing cards in greater detail with respect to FIGS. 4A-4C, the set 10 of outcome playing cards further includes a set of rules playing cards 150. Located on the back of the rules playing cards 150 is a series of rules and regulations for how to play the interactive playing card game and baseball game, as will be discussed in greater detail later. In particular, rules 1 and 2 are located on the back of rules playing card 150a (FIG. 4A). Rules 3 and 4 are located on the back of rules playing card 150b (FIG. 4B). Rule 5 and additional rules are located on the back of rules playing card 150c (FIG. 4C). It is to be understood that a rules booklet (not shown) may be included with the packaging in which the set 10 of outcome paying cards is placed. It is to be further understood that the purpose of rules playing cards 150 is that all of the rules and regulations for playing the interactive card game are included with the interactive card game so that all of the players will have a complete understanding of the rules and regulations and how to play the interactive playing card game.

Method of Playing the Game

Figure 5:
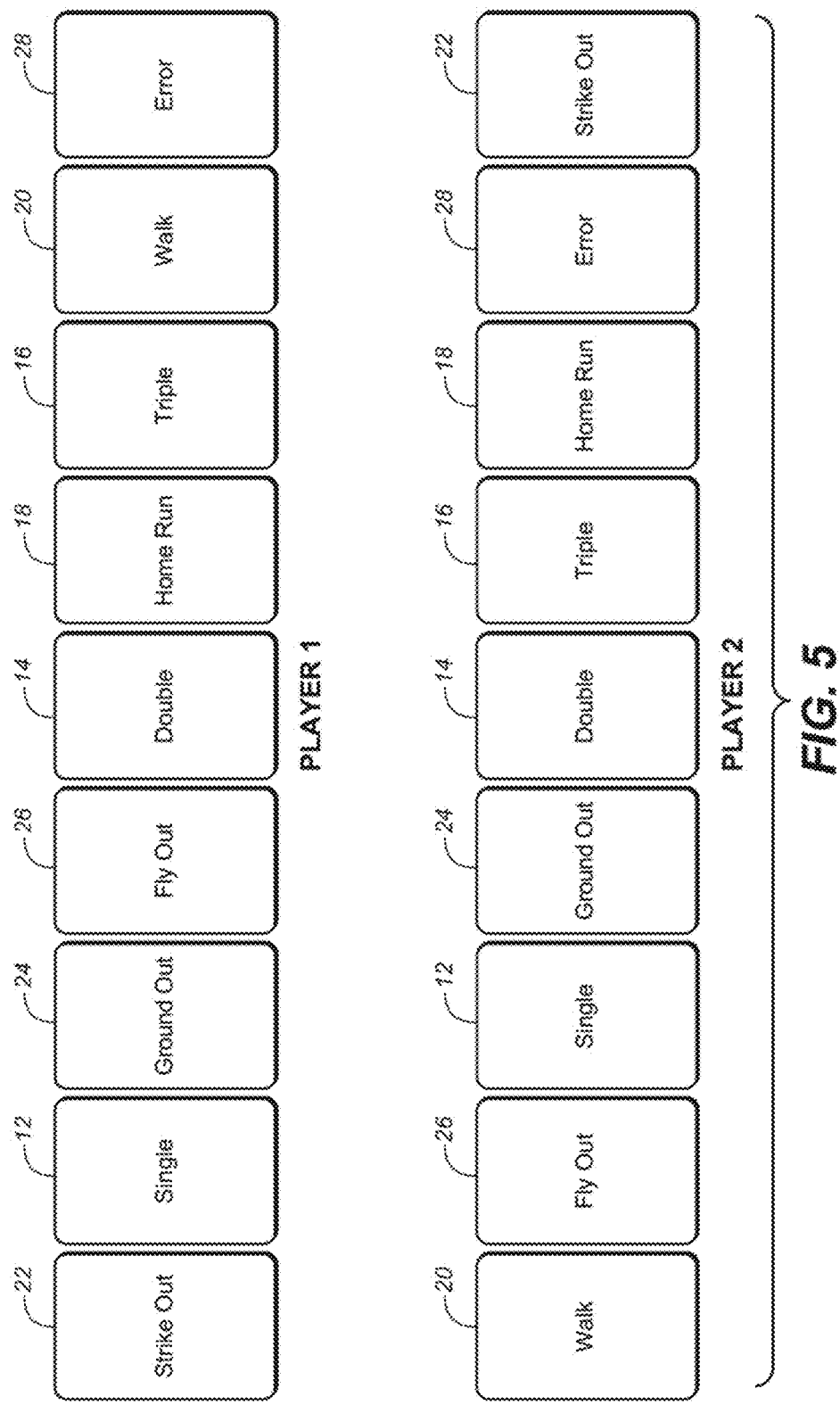
FIG. 5 is an illustration of exemplary outcome card lineup for player 1 and player 2, according to the present invention.
Figure 6:
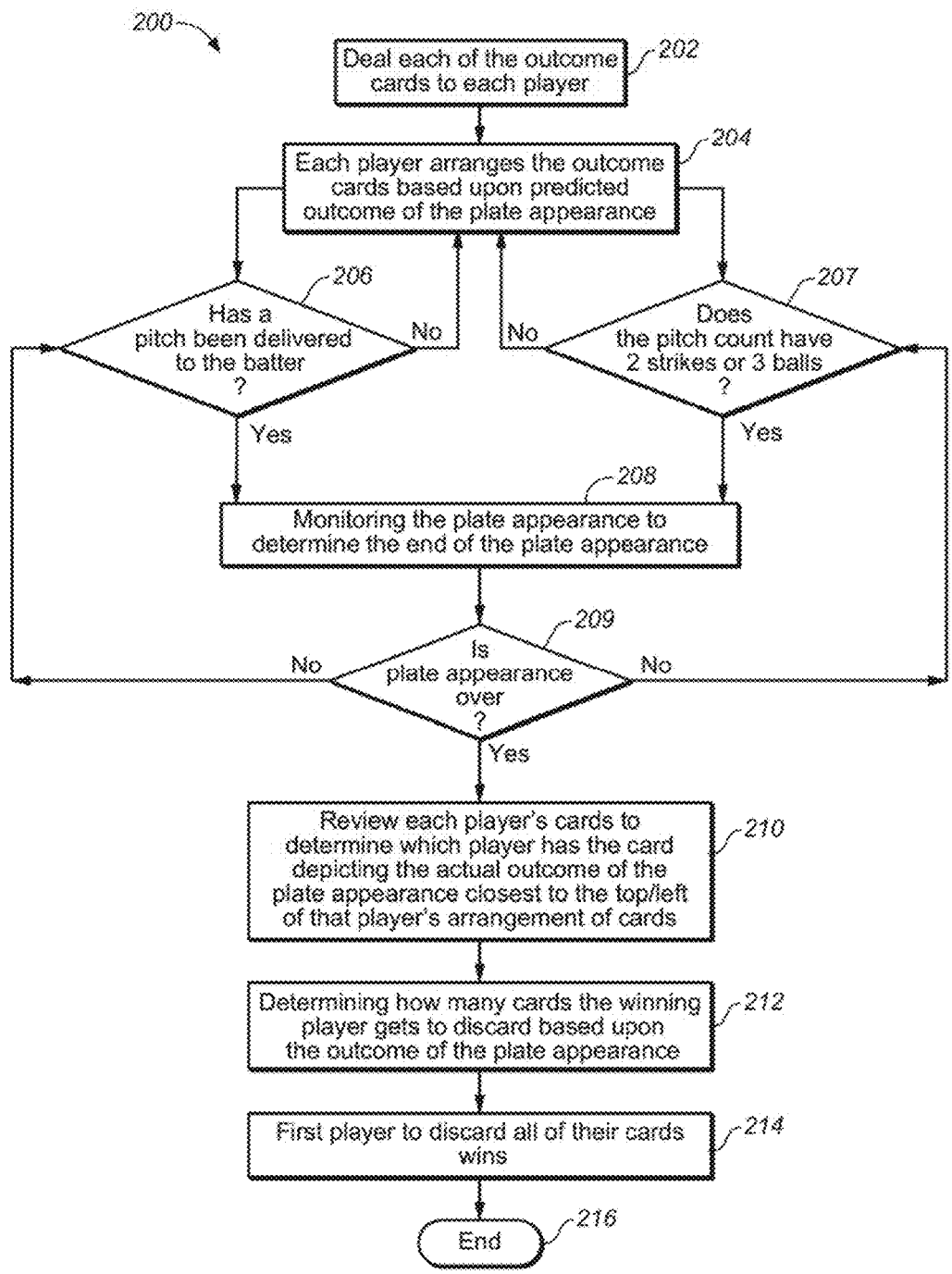
FIG. 6 is a flowchart that illustrates the method of playing the interactive card game, according to the present invention.

Considering now the method 200 of playing the interactive card game and baseball game in greater detail with reference to FIGS. 5 and 6, after the number of players to play the interactive card game has been determined, each player is dealt one (1) each of the outcome cards 12-28, as described earlier for a total of 9 cards, as shown in step 202. In particular, each player will be dealt a single card 12, a double card 14, a triple card 16, a home run card 18, a walk card 20, a strike out card 22, a ground out card 24, a fly out card 28 and an error card 28. It is to be understood that the players should keep their outcome cards 12-28 hidden from the other players. It is to be further understood that if further outcome cards are created, for example, a fielder's choice outcome card, then that fielder's choice card is also dealt to each of the players.

In step 204, the players must set their "lineup" by arranging their outcome cards 12-28 in order from left to right. It is to be understood that the outcomes should be retained by the player so that the other players do not see how that particular player arranged his/her lineup. As shown in FIG. 5, suppose player 1 arranges his/her lineup so that his/her single card 12 second in his/her lineup (second card from the left). Player 2 placed his/her single card 12 third in his/her lineup (third card from the left). If the batter hit a single during that particular plate appearance, player 1 would win the plate appearance because player 1 had the correct outcome of that particular plate appearance (a single) and player 1 had the correct outcome card (single card 12) closest to the left in his/her outcome card lineup. As a result of winning the plate appearance, player 1 would be allowed to discard a predetermined number of outcome cards into the center, as discussed in greater detail later. It is to be understood that the outcome cards in FIG. 5 are illustrated as being face up for discussion purposes. However, as discussed above, normally the player's outcome card lineups would be face down so that the players cannot see each other's outcome card lineups.

It is to be understood that the players may instead opt to hold their outcome cards in their hands. In this manner, the players must set their "lineup" by arranging their outcome cards 12-28 from top to bottom. Prior to a pitch being delivered to the batter during a plate appearance, the players may arrange their outcome cards in their hand based upon the predicted outcome of the particular plate appearance by that batter. Once the pitcher has delivered the pitch or the pitch count has three (3) balls or two (2) strikes, the players must close their outcome card hands and their closed outcome card hands should have, as the top or first card in their hand, the predicted outcome of the particular plate appearance by that batter. With respect to FIG. 5, under this alternative way to create the outcome card lineup, suppose player 1 placed his/her single card 12 second in his/her lineup (second card from the top). Player 2 placed his/her single card 12 third in his/her lineup (third card from the top). If the batter hit a single during that particular plate appearance, player 1 would win the plate appearance because player 1 had the correct outcome of that particular plate appearance (a single) and player 1 had the correct outcome card (single card 12) closest to the top in his/her outcome card lineup. As a result of winning the plate appearance, player 1 would be allowed to discard a predetermined number of outcome cards into the center, as discussed in greater detail later.

At this point, the attention of the game is turned to the action going on at the actual baseball game. As shown in step 206, during the plate appearance, a determination is made to decide if a pitch is being delivered to the batter. Players can change the order of their outcome card lineup (FIG. 5) in between pitches however, no changes may be made to a player's outcome card lineup once the pitcher begins his delivery or when the ball is in play.

As shown in step 207, the number of balls and strikes that the batter has accumulated during the plate appearance is also monitored. Once the batter has either 2 strikes or 3 balls in the pitch count, all player outcome card lineups are locked and no further changes can be made to that particular player's outcome card lineup. It is to be understood that this rule can be ignored to make the game easier for less knowledgeable baseball fans. This rule was created to make the game more strategic and advanced.

Regarding step 208, the plate appearance for that particular batter is then monitored to determine the outcome of that plate appearance.

As shown in step 209, if the plate appearance is not over, the method 200 proceeds back to steps 206 and 207 to determine if pitch has been delivered to the batter (step 206) and to determine if the pitch count has two (2) strikes or three (3) balls. If the plate appearance is over, the method 200 proceeds to step 210.

Once the outcome of the plate appearance has been determined, as shown in step 210, each of the players reviews his/her lineup to determine if that outcome was placed in his/her lineup and, if that particular outcome was in the player's lineup, in which location of the lineup was that outcome placed. For example, as discussed above with respect to FIG. 5, assume that the batter hit, a single. The outcome of that plate appearance would be a single. Also, assume that player 1 placed their single card 12 second in their outcome card lineup (second card from the left or top) and Player 2 placed their single card 12 third in their outcome card lineup (third card from the left or top). Because the batter hit a single during that particular plate appearance, Player 1 would win the plate appearance because Player 1 had the correct outcome card (single card 12) in his/her outcome card lineup and Player 1 placed the correct outcome card (single card 12) closest to the left or top of all of the outcome cards in his/her lineup versus to where player 2 placed his/her single outcome card (third in his/her outcome card lineup).

Upon determining which player or players had the correct outcome card in their lineup and which of those players had the correct outcome card closest to the left of the cards in their lineup (or closest to the top in their lineup), a determination is made by the winning player or some other designated individual as to how many outcome cards the winning player for that particular plate appearance is allowed to discard onto the discard pile, as shown in step 212. For example, depending upon the outcome of the plate appearance, the winning player gets to discard a set amount of outcome cards, as set forth below in Table 1. It is to be understood that the discard amount for a particular plate appearance outcome (Outcome of PA) can be changed.

TABLE 1

Discard Amount Table

| Outcome of PA | Discard Amount |
|---|---|
| K, GO, FO, BB, E | 1 |
| 1B | 2 |
| 2B | 3 |
| 3B | 4 |
| HR | 5 |
| RBI | +1 |

For example, a batter hits a double during a particular plate appearance. As a further result of that double, the double by the batter allowed a base runner to score so the batter will be credited with a run batted in (RBI). The player who placed the "double" card 14 closest to the left or top in his/her lineup, wins that plate appearance and gets to discard four (4) cards from his outcome card lineup (3 cards as a result of the double and 1 additional card because of the RBI. If two (2) base runners scored as a result of the batter's double, then part of the outcome of that plate appearance would be two (2) RBI's and the player can discard five (5) outcome cards from that player's outcome card lineup.

As shown in step 214, the first player to discard ail of his/her outcome cards from their outcome card lineup wins and the session for that particular game ends, as shown in step 216.

It is to be understood that additional rules and regulations can be added and utilized in the method 200 of playing the interactive card game and baseball game while still staying within the spirit and letter of the interactive card game and baseball game. For example, if the winning player for a plate appearance placed the correct outcome card first (closest to the left or top) in their outcome card lineup, that winning player has the option to either "dump" their outcome cards onto another player or the winning player can discard all of his/her remaining outcome cards in their lineup into the center. For example, player 1 had the single card closest to the left or top (first in their lineup), then player 1 (as long as there is not a tie) can discard 2 cards since this is the predetermined amount. Since it was first in his order, that player has the option to "dump" up to two (2) cards onto another player or discard up to two (2) outcome cards into the discard pile. It is to be understood that if multiple players have the correct outcome card first in their outcome card lineup then the tiebreaking rules, as discussed in greater detail below, will come into effect and each player can discard only one (1) card and can only discard into the center "discard" pile and not "dump" onto another player. This is referred to as the "Top of the Order Bonus".

As an example of a further additional rule, in the event that at least two players have the same correct outcome card located in the same position of their lineups ("Tiebreaker"), all the players who have the same correct outcome card located in the same position of their lineups get to discard only one (1) outcome card from their outcome card lineup into the center "discard" pile.

Finally, it is to be understood that while the exemplary embodiments described herein have included card-based implementations of the interactive card game and baseball game, other exemplary embodiments may include electronic gaming devices and electronic systems (such as, but not limited to, the Internet, mobile phones, tablets, gaming devices, slot machines, computers, etc.). It is within the scope of this disclosure to implement games utilizing electronic components or printed materials other than cards. For example, exemplary games may be played on a personal computer, game system, or gaming machine (such as a slot machine) in a stand-alone capacity or utilizing a communications network, such as the Internet. As an example, computers and/or game systems may be utilized to play exemplary games where the players are geographically separated, and exemplary games may be played on networked personal computers. In other embodiments, exemplary games may be played utilizing mobile devices, such as mobile phones, tablets, personal digital assistants, or portable video game devices, for example. In a stand-alone or networked capacity, exemplary games may be provided on electronic equipment adapted specifically for gaming. Such devices may be used, for example, in a video game arcade, a bar/restaurant, and/or a casino. It is to be understood that implementations of games on electronic systems may include representations of representations of any aspect of a game, including any cards, plate appearances, outcomes, discard piles, decks, etc.

Exemplary methods may be implemented in the general context of non-transitory computer-executable instructions that may run on one or more computers, and exemplary methods may also be implemented in combination with program modules and/or as a combination of hardware and software. Generally, program modules include routines, programs, components, data structures, etc., that perform particular tasks or implement particular abstract data types. Moreover, those skilled in the art will appreciate that exemplary methods can be practiced using or with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices. Exemplary methods may also be practiced in distributed computing environments where certain tasks are performed by remote processing devices that are linked through a communications network. In a distributed computing environment, program modules can be located in both local and remote memory storage devices.

An exemplary computer typically includes a variety of computer readable media. Computer readable media can be any available media that can be accessed by the computer and includes transitory and non-transitory media, removable and non-removable media. By way of example, and not limitation, computer-readable media can comprise computer storage media and communication media. Computer storage media includes transitory and non-transitory, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope, of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and, optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and the include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to it the invention, except as indicated in the appended claims.

Therefore, provided herein is a new and improved interactive playing card game and baseball game and a novel method of using the interactive playing card game and baseball game. The preferred interactive playing card game, according to various embodiments of the present invention, offers the following advantages: ease of use of the set 10 of playing cards, the portability of the set 10 of playing cards, and the ability of the set 10 of playing cards to be used at any location where the sporting event is being played live or remotely viewed. In fact, in many of the preferred embodiments, these factors of ease of use, portability, and the ability of the set of playing cards to be used at any location where the sporting event is being played live or remotely viewed are optimized to an extent that is considerably higher than heretofore achieved in prior, known card games.

I claim:

1. A non-transitory computer readable medium having encoded thereon software programmed to cause a computer to perform a method of playing an interactive card game that is played in conjunction with observing a live baseball game, comprising the steps of:

manually dealing nine outcome cards to each of the players before the start of an interactive baseball-related card game, wherein each of the nine outcome cards is based upon the likelihood of a particular event occurring during a plate appearance by a batter during a live baseball game;

manually arranging, by each player, each of the nine outcome cards based upon a predicted outcome of the plate appearance of the batter by that player during the live baseball game to create an outcome card lineup, wherein the nine outcome cards are arranged such that a most likely outcome of the plate appearance of the batter during the live baseball game, as predicted by that particular player, is placed at the top of all of the nine outcome cards in that particular player's nine outcome card lineup;

monitoring the plate appearance of the batter during the live baseball game;

determining an actual outcome of the plate appearance of the batter during the live baseball game;

reviewing each of the player's outcome card lineups to determine which player is the winning player for the plate appearance by the batter during the live baseball game by determining which player has a correct outcome card that corresponds to the actual outcome and which of the players with the correct outcome card has the correct outcome card located closest to the top of all of the nine outcome cards in that particular player's outcome card lineup;

determining how many outcome cards the winning player manually discards based upon the actual outcome of the plate appearance; and determining a winner of the interactive baseball-related card game.

2. The non-transitory computer readable medium having encoded thereon software programmed to cause a computer to perform a method of playing an interactive card game that is played in conjunction with observing a live baseball game, according to claim 1, wherein the step of monitoring the plate appearance of the batter during the live baseball game is further comprised of the step of:

determining if a pitch has been delivered to the batter during the live baseball game.

3. The non-transitory computer readable medium having encoded thereon software programmed to cause a computer to perform a method of playing an interactive card game that is played in conjunction with observing a live baseball game, according to claim according to claim 2, wherein the step of determining if a pitch has been delivered to the batter during the live baseball game is further comprised of the step of:

allowing the players to manually re-arrange, if desired, each of the nine outcome cards in their nine outcome card lineups based upon a revised predicted outcome of the plate appearance of the batter by that player during the live baseball game to create a revised nine outcome card lineup if a pitch has not been delivered to the batter.

4. The non-transitory computer readable medium having encoded thereon software programmed to cause a computer to perform a method of playing an interactive card game that is played in conjunction with observing a live baseball game, according to claim 3, wherein the step of determining if a pitch has been delivered to the batter during the live baseball game is further comprised of the step of:

determining if a batter's pitch count includes two strikes or three balls.

\* \* \* \* \*